United States Patent
Ly et al.

(10) Patent No.: US 10,813,063 B2
(45) Date of Patent: Oct. 20, 2020

(54) SYNCHRONIZATION SIGNAL TRANSMISSION IN A NEW RADIO WIRELESS COMMUNICATION SYSTEM

(71) Applicant: QUALCOMM Incorporated, San Diego, CA (US)

(72) Inventors: Hung Ly, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/920,256

(22) Filed: Mar. 13, 2018

(65) Prior Publication Data

US 2018/0270772 A1    Sep. 20, 2018

Related U.S. Application Data

(60) Provisional application No. 62/471,704, filed on Mar. 15, 2017.

(51) Int. Cl.
*H04W 56/00* (2009.01)
*H04W 72/04* (2009.01)
(Continued)

(52) U.S. Cl.
CPC .......... *H04W 56/001* (2013.01); *H04L 5/001* (2013.01); *H04L 5/0048* (2013.01);
(Continued)

(58) Field of Classification Search
CPC ......... H04L 1/16; H04L 5/001; H04L 5/0048; H04L 5/0053; H04L 5/0092; H04W 56/00;
(Continued)

(56) References Cited

U.S. PATENT DOCUMENTS

| 2012/0320833 A1* | 12/2012 | Yamamoto | H04L 5/0053 370/328 |
| 2014/0010131 A1 | 1/2014 | Gaal et al. | |
| 2014/0286286 A1* | 9/2014 | Yamazaki | H04W 56/00 370/329 |

FOREIGN PATENT DOCUMENTS

WO    WO-2018/052275 A1    3/2018

OTHER PUBLICATIONS

Huawei et al., "Discussion and Evaluation on NR-SS Periodicity", 3GPP Draft; R1-1701721, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13-Feb. 17, 2017, Feb. 12, 2017, XP051208887, Retrieved from the Internet: URL:http://www.3gpp.org/ftp/Meetings_3GPP_SYNC/RAN1/Docs/ [retrieved on Feb. 12, 2017], 4 pages.

(Continued)

*Primary Examiner* — Khoa Huynh
(74) *Attorney, Agent, or Firm* — Arent Fox LLP

(57) ABSTRACT

A method and apparatus for configurable synchronization signal transmissions that reduce complexity of cell synchronization in a new radio wireless communication system is disclosed. For example, the method and apparatus may include generating a first synchronization signal burst set having a first set of synchronization signal blocks, generating at least a second synchronization signal burst set having a second set of synchronization signal blocks, transmitting the first synchronization signal block over a first frequency, and transmitting the second synchronization signal block over a second frequency.

30 Claims, 11 Drawing Sheets

(51) Int. Cl.
H04W 72/00 (2009.01)
H04L 5/00 (2006.01)
(52) U.S. Cl.
CPC .......... H04L 5/0053 (2013.01); H04L 5/0092 (2013.01); H04W 72/005 (2013.01); H04W 72/0446 (2013.01); *H04W 72/046* (2013.01); *H04W 72/0453* (2013.01)
(58) Field of Classification Search
CPC ............. H04W 56/001; H04W 72/005; H04W 72/0446; H04W 72/0453; H04W 72/046
See application file for complete search history.

(56) References Cited

OTHER PUBLICATIONS

International Search Report and Written Opinion—PCT/US2018/022459—ISA/EPO—dated Jun. 22, 2018 20 pages.
LG Electronics: "Discussion on Wideband Operation", 3GPP Draft; R1-1702503 Wideband, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13-Feb. 17, 2017, Feb. 12, 2017, XP051209657, Retrieved from the Internet: URL:http://www.3gpp.org/ftp/Meetings_3GPP_SYNC/RAN1/Docs/ [retrieved on Feb. 12, 2017], 10 pages.
Nokia et al., "On Requirements and Design of SS Burst Set and SS Block Index Indication", 3GPP Draft; R1-1703092, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13-Feb. 17, 2017, Feb. 12, 2017, XP051210230, Retrieved from the Internet: URL:http://www.3gpp.org/ftp/Meetings_3GPP_SYNC/RAN1/Docs/ [retrieved on Feb. 12, 2017], 15 pages.
ZTE et al., "NR-SS: Frequency Raster", 3GPP Draft; R1-1701574, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13-Feb. 17, 2017, Feb. 12, 2017, XP051208741, Retrieved from the Internet: URL:http://www.3gpp.org/ftp/Meetings_3GPP_SYNC/RAN1/Docs/ [retrieved on Feb. 12, 2017], 6 pages.

\* cited by examiner

SYNCHRONIZATION SIGNAL TRANSMISSION IN A NEW RADIO WIRELESS COMMUNICATION SYSTEM

CLAIM OF PRIORITY UNDER 35 U.S.C. § 119

The present Application for Patent claims priority to U.S. Provisional Application No. 62/471,704 entitled "SYNCHRONIZATION SIGNAL TRANSMISSION IN A NEW RADIO WIRELESS COMMUNICATION SYSTEM" filed Mar. 15, 2017, which is assigned to the assignee hereof and hereby expressly incorporated by reference herein.

BACKGROUND

Aspects of the present disclosure relate generally to wireless communication networks, and more particularly, to configurable synchronization signal transmissions that reduce complexity of cell synchronization in a new radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, various synchronization signal transmissions have been discussed and the implementation of certain transmissions have been left to system operators. Thus, an efficient design of synchronization signaling in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes configurable synchronization signal transmissions that reduce complexity of cell synchronization for wireless communications. The described aspects include generating a first synchronization signal block having a first set of synchronization signals. The described aspects further include generating at least a second synchronization signal block having a second set of synchronization signals different from the first set of synchronization signals. The described aspects further include transmitting the first synchronization signal block in a first portion of a radio frame. The described aspects further include transmitting the second synchronization signal block in a second portion of the radio frame, wherein the second portion differs from the first portion.

In an aspect, an apparatus for configurable synchronization signal transmissions that reduce complexity of cell synchronization for wireless communications may include a transceiver, a memory; and at least one processor coupled to the memory and configured to generate a first synchronization signal block having a first set of synchronization signals. The described aspects further generate at least a second synchronization signal block having a second set of synchronization signals different from the first set of synchronization signals. The described aspects further transmit the first synchronization signal block in a first portion of a radio frame. The described aspects further transmit the second synchronization signal block in a second portion of the radio frame, wherein the second portion differs from the first portion.

In an aspect, a computer-readable medium may store computer executable code for configurable synchronization signal transmissions that reduce complexity of cell synchronization for wireless communications is described. The described aspects include code for generating a first synchronization signal block having a first set of synchronization signals. The described aspects further include code for generating at least a second synchronization signal block having a second set of synchronization signals different from the first set of synchronization signals. The described aspects further include code for transmitting the first synchronization signal block in a first portion of a radio frame. The described aspects further include code for transmitting the second synchronization signal block in a second portion of the radio frame, wherein the second portion differs from the first portion.

In an aspect, an apparatus for configurable synchronization signal transmissions that reduce complexity of cell synchronization for wireless communications is described. The described aspects include means for generating a first synchronization signal block having a first set of synchronization signals. The described aspects further include means for generating at least a second synchronization signal block having a second set of synchronization signals different from the first set of synchronization signals. The described aspects further include means for transmitting the first synchronization signal block in a first portion of a radio frame. The described aspects further include means for transmitting the second synchronization signal block in a second portion of the radio frame, wherein the second portion differs from the first portion.

In accordance with an aspect, a method includes configurable synchronization signal transmissions that reduce complexity of cell synchronization for wireless communications.

The described aspects include generating a first synchronization signal burst set having a first set of synchronization signal blocks. The described aspects further include generating at least a second synchronization signal burst set having a second set of synchronization signal blocks. The described aspects further include transmitting the first synchronization signal burst set over a first frequency. The described aspects further include transmitting the second synchronization signal burst set over a second frequency.

In an aspect, an apparatus for configurable synchronization signal transmissions that reduce complexity of cell synchronization for wireless communications may include a transceiver, a memory; and at least one processor coupled to the memory and configured to generate a first synchronization signal burst set having a first set of synchronization signal blocks. The described aspects further generate at least a second synchronization signal burst set having a second set of synchronization signal blocks. The described aspects further transmit the first synchronization signal burst set over a first frequency. The described aspects further transmit the second synchronization signal burst set over a second frequency.

In an aspect, a computer-readable medium may store computer executable code for configurable synchronization signal transmissions that reduce complexity of cell synchronization for wireless communications is described. The described aspects include code for generating a first synchronization signal burst set having a first set of synchronization signal blocks. The described aspects further include code for generating at least a second synchronization signal burst set having a second set of synchronization signal blocks. The described aspects further include code for transmitting the first synchronization signal burst set over a first frequency. The described aspects further include code for transmitting the second synchronization signal burst set over a second frequency.

In an aspect, an apparatus for configurable synchronization signal transmissions that reduce complexity of cell synchronization for wireless communications is described. The described aspects include means for generating a first synchronization signal burst set having a first set of synchronization signal blocks. The described aspects further include means for generating at least a second synchronization signal burst set having a second set of synchronization signal blocks. The described aspects further include means for transmitting the first synchronization signal burst set over a first frequency. The described aspects further include means for transmitting the second synchronization signal burst set over a second frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
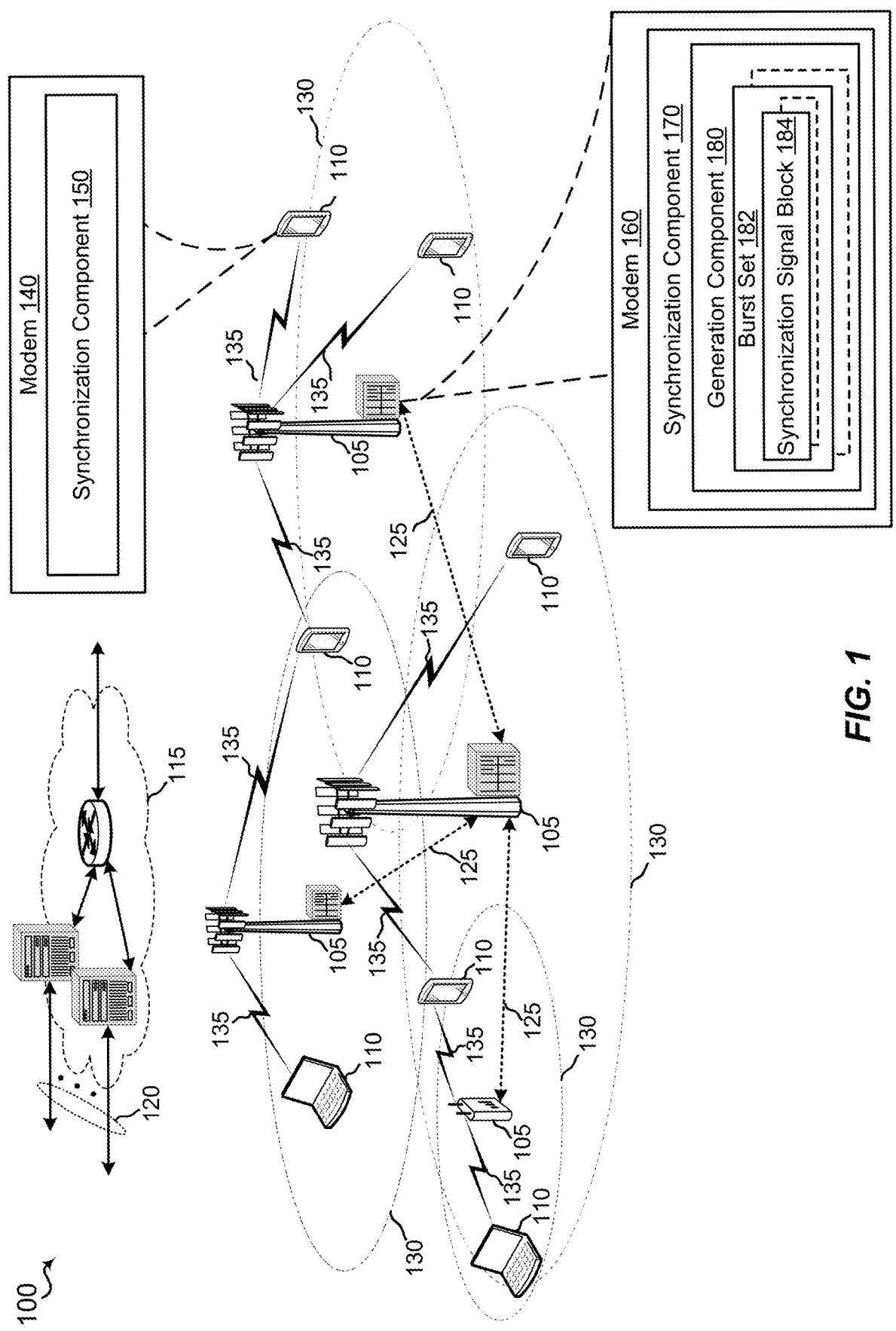
FIG. 1 is a schematic diagram of a wireless communication network including at least one base station having a synchronization component configured to generate configurable synchronization signal transmissions to reduce complexity of cell synchronization.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to synchronization signal transmissions in a wireless communication system.

In an example, synchronization signal transmission periodicity depends on UE states. When the UE is in initial access (e.g., when the UE is powered up or out of coverage recovery) the synchronization signal transmission periodicity may be fixed. The periodicity may be either 10 milliseconds (ms) or 20 ms. In other UE states (e.g., idle or connected mode states), if the network provides one synchronization signal burst set periodicity information per frequency carrier to a UE and information to derive measurement timing and/or duration, then 5G/NR may support different sets of synchronization signal burst set periodicity values for adaptation and network indication. For example, candidate periodicity values may include, but are not limited to, 5, 10, 20, 40, 80 and/or 160 ms. In some examples, if the UE is not configured with a measurement window and periodicity, then the UE may assume a synchronization signal periodicity of 5 ms based on a baseline synchronization signaling design.

However, in many deployments, synchronization signal periodicity may be an integer multiple of a radio frame duration (e.g., multiples of 10 ms). That is, deployments with 5 ms synchronization signal periodicity may occur less frequently. As such, the above-noted 5 ms synchronization signal periodicity assumption may lead to an unnecessarily complex synchronization signaling design and to unnecessarily complex synchronization signal detection algorithms at the UE.

To address this issue, the present aspects provide configurable synchronization signal transmissions to reduce complexity of cell synchronization.

In one aspect, the network may transmit different sets of synchronization signals asymmetrically. For example, the network may generate a first synchronization signal block having a first set of synchronization signals, generate at least a second synchronization signal block having a second set of synchronization signals different from the first set of synchronization signals, transmit the first synchronization signal block in a first portion of a radio frame, and transmit the second synchronization signal block in a second portion of the radio frame, wherein the second portion differs from the first portion.

Further, in another aspect, the network may transmit the same or different sets of synchronization signals over different frequencies. For example, the present aspects may include generating a first synchronization signal block having a first set of synchronization signals, generating at least a second synchronization signal block having a second set of synchronization signals, transmitting the first synchronization signal block over a first frequency, and transmitting the second synchronization signal block over a second frequency.

Additional features of the present aspects are described in more detail below with respect to FIGS. 1-12.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications, e.g., to 5G or NR networks or other next generation communication systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 and at least one base station 105 with a modem 160 having a synchronization component 170 that enables configurable synchronization signal transmissions to reduce complexity of cell synchronization. In one implementation, for instance, base station 105 may execute synchronization component 170 to transmit different sets of synchronization signals asymmetrically. In another implementation, for instance, base station 105 may execute synchronization component 170 to transmit the same or different sets of synchronization signals over different frequencies.

In an aspect, the UE 110 may include a modem 140 having a synchronization component 150 that receives the sets of synchronization signals. For example, the base station 105 and/or synchronization component 170 may generate and transmit synchronization information including a value of the periodicity of the synchronization signal burst set, a value of a timing offset, and an indication as to which synchronization signal blocks are included in the synchronization signal burst set to the UE 110 and/or synchronization component 150. The base station 105 and/or synchronization component 170 may transmit the synchronization information in system information, such as International Mobile Subscriber Identity (IMSI) and/or Open System Interconnection (OSI). In another implementation, the base station 105 and/or synchronization component 170 may transmit the synchronization information in a Radio Resource Connection (RRC) message during a connected state.

Thus, according to the present disclosure, the base station 105 may either asymmetrically transmit synchronization signals, or transmit the same or different sets of synchronization signals over different frequencies, to one or more UEs, such as UE 110 for the purposes of synchronizing the one or more UEs with network 100.

In an aspect of transmitting different sets of synchronization signals asymmetrically, synchronization component 170 may include generation component 180, which may be configured to generate a first synchronization signal block 184 having a first set of synchronization signals and generate at least a second synchronization signal block 184 having a second set of synchronization signals different from the first set of synchronization signals. In an example, the first synchronization signal block 184 and the second synchronization signal block 184 may be included within a single burst set 182. In another example, the first synchronization signal block 184 and the second synchronization signal block 184 may be included in separate burst sets 182.

In some instances, the second set of synchronization signals is a subset of the first set of synchronization signals. For example, the first set of synchronization signals includes a primary synchronization signal (PSS) and a secondary synchronization signal (SSS). Further, the PSS is configured to signal frame timing instead of the SSS.

In some instances, each of the first set of synchronization signals and the second set of synchronization signals include at least one of a PSS, a SSS, a tertiary synchronization signal (TSS), and physical broadcast channel (PBCH).

In some instances, synchronization component 170 may configure a transceiver, such as transceiver 1202 (FIG. 12) to transmit the first synchronization signal block 184 in a first portion of a radio frame and transmit the second synchronization signal block 184 in a second portion of the radio frame. In an example, the second portion differs from the first portion. In a further example, the first portion occurs in time before the second portion.

In some instances, synchronization component 170 may configure the transceiver, such as transceiver 1202 (FIG. 12) to transmit the first synchronization signal block 184 over either a same or different one or more antenna ports, such as antenna(s) 1265. Further, synchronization component 170 may configure the transceiver, such as transceiver 1202 to transmit the second synchronization signal block 184 over either the same or different one or more antenna ports, such as antenna(s) 1265.

In some instances, the synchronization component 170 may be configured to periodically transmit synchronization signals to one or more UEs, such as UE 110. For example, synchronization component 170 may include generation component 180, which may be configured to generate a first synchronization signal block 184 having a first set of synchronization signals and generate at least a second synchronization signal block 184 having a second set of synchronization signals. In an example, the first set of synchronization signals differ from the second set of synchronization signals.

In some instances, the first synchronization signal block 184 is one of a first plurality of synchronization signal blocks of a burst set 182. The second synchronization signal block 184 is one of a second plurality of synchronization signal blocks of the burst set 182. In an example, the second plurality of synchronization signal blocks differs from the first plurality of synchronization signal blocks. In another example, the second plurality of synchronization signal blocks is a subset of the first plurality of synchronization signal blocks.

In an aspect of transmitting the same or different sets of synchronization signals over multiple frequencies, the synchronization component 170 may configure a transceiver, such as transceiver 1202 (FIG. 12) and/or antenna(s) 1265 to transmit the first synchronization signal block 184 over a first frequency and transmit the second synchronization signal block 184 over a second frequency. In some cases, the first frequency and the second frequency may be within a same carrier frequency band, while in other cases they may be in different carrier frequency bands. Accordingly, the UE 110 and/or modem 140 may execute transceiver 1102 (FIG. 11) and/or antenna(s) 1165 to receive the first synchronization signal block 184 over a first frequency and transmit the second synchronization signal block 184 over a second frequency.

In some instances, synchronization component 170 may configure the transceiver, such as transceiver 1202 (FIG. 12) and/or antenna(s) 1265 to transmit the first synchronization signal block 184 by transmitting with a first periodicity and to transmit the second synchronization signal block 184 by transmitting with a second periodicity different from the first periodicity. In another aspect, synchronization component 170 may configure the transceiver, such as transceiver 1202 to transmit the first synchronization signal block 184 by transmitting with a first periodicity and to transmit the second synchronization signal block 184 by transmitting with a second periodicity same as the first periodicity. Accordingly, the UE 110 and/or modem 140 may execute transceiver 1102 (FIG. 11) and/or antenna(s) 1165 to receive the first synchronization signal block 184 with a first periodicity and to receive the second synchronization signal block 184 with a second periodicity.

In some instances, synchronization component 170 may configure the transceiver, such as transceiver 1202 (FIG. 12) and/or antenna(s) 1265 to stagger the transmitting of the first synchronization signal block 184 relative to the transmitting of the second synchronization signal block 184 within a time window. Accordingly, the UE 110 and/or modem 140 may execute transceiver 1102 (FIG. 11) and/or antenna(s) 1165 to receive the staggered transmissions of the first synchronization signal block 184 and the second synchronization signal block 184 within a time window.

In some instances, synchronization component 170 may configure the transceiver, such as transceiver 1202 (FIG. 12) and/or antenna(s) 1265 to transmit the first plurality of synchronization signal blocks over the first frequency within the carrier frequency band. Further, synchronization component 170 may configure the transceiver, such as transceiver 1202 to transmit the second synchronization signal block by transmitting the second plurality of synchronization signal blocks over the second frequency within the carrier frequency band. Accordingly, the UE 110 and/or modem 140 may execute transceiver 1102 (FIG. 11) and/or antenna(s) 1165 to receive the plurality of synchronization signal blocks over the first frequency within the carrier frequency band and the second plurality of synchronization signal blocks over the second frequency within the carrier frequency band.

In some instances, each of the first set of synchronization signals and the second set of synchronization signals include at least one of a PSS, a SSS, a tertiary synchronization signal (TSS), and physical broadcast channel (PBCH). In some instances, synchronization component 170 may configure the transceiver, such as transceiver 1202 (FIG. 12) and/or antenna(s) 1265 to transmit the PSS, the SSS, the TSS, and the PBCH over same antenna ports or different antenna ports, such as the same or different ports of antenna(s) 1265. Further, in some instances, base station 105 may transmit a subset of signals (e.g., PSS, SSS, TSS, PBCH) over the same antenna ports. Accordingly, the UE 110 and/or modem 140 may execute transceiver 1102 (FIG. 11) and/or antenna(s) 1165 to receive the PSS, the SSS, the TSS, and the PBCH.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuL-TEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
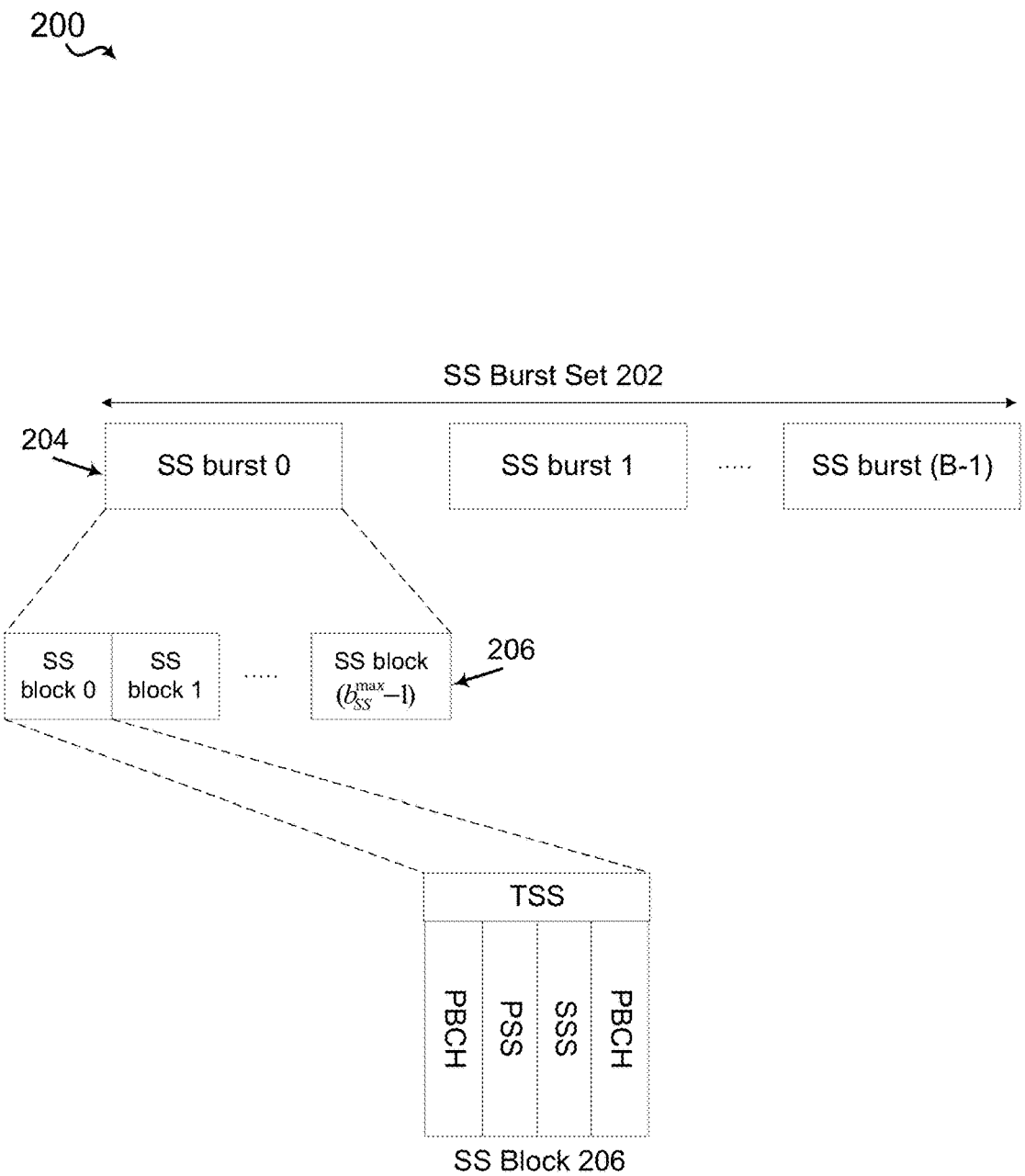
FIG. 2 is a conceptual diagram of an example synchronization signal hierarchy scheme of a synchronization signal burst set having a plurality of synchronization signal bursts each comprising a plurality of synchronization signal blocks.

Referring to FIG. 2, a conceptual diagram of synchronization signal hierarchy scheme 200 used by base station 105 for transmitting a synchronization signal burst set 202 comprising a plurality of synchronization signal bursts 204 each having one or more synchronization signal blocks 206 is described. For example, the synchronization signal hierarchy 200 includes a synchronization signal burst set 202, similar to burst set 182, that includes a plurality of synchronization signal bursts 204 (e.g., SS burst 0, SS burst 1, SS burst [b-1]). In an aspect, each synchronization signal burst set 202 may be repeated with a pre-defined periodicity. Each synchronization signal burst 204 includes one or more synchronization signal blocks 206 (e.g., SS block 0, SS block 1, SS block $((b_{SS}^{max}-1)))$, similar to synchronization block 184.

Each synchronization signal block 206 may include at least one of a PSS, a SSS, a TSS, and PBCH. The PSS may be configured for signaling symbol timing. The SSS may be configured for signaling physical cell ID, working as a PBCH demodulation reference signal (DMRS), and supporting radio resource measurement (RRM). The TSS may be configured for signaling synchronization signal block index. The PBCH may be configured for signaling minimum system information to support the UE, such as UE 110, in initial access procedures.

In an aspect, base station 105 may transmit the PSS, the SSS, the TSS, and the PBCH over a same antenna port, or over different antenna ports. Further, in some instances, base station 105 may transmit a subset of signals (e.g., PSS, SSS, TSS, PBCH) over the same antenna ports.

For example, base station 105 may transmit synchronization signal burst sets with a periodicity that depends on a state of UE 110. For instance, when UE 110 is in initial access (e.g., when the UE is powered up or out of coverage recovery) the synchronization signal transmission periodicity may be fixed. In an example, the periodicity may be either 10 ms or 20 ms. In other UE states (e.g., idle or connected), base station 105 may provide one synchronization signal burst set periodicity information per frequency carrier to UE 110, along with information to derive measurement timing and/or duration. In many instances, if UE 110 is not configured with a measurement window and periodicity, then UE 110 may assume a synchronization signal periodicity of 5 ms based on a baseline synchronization signaling design.

Figure 3:
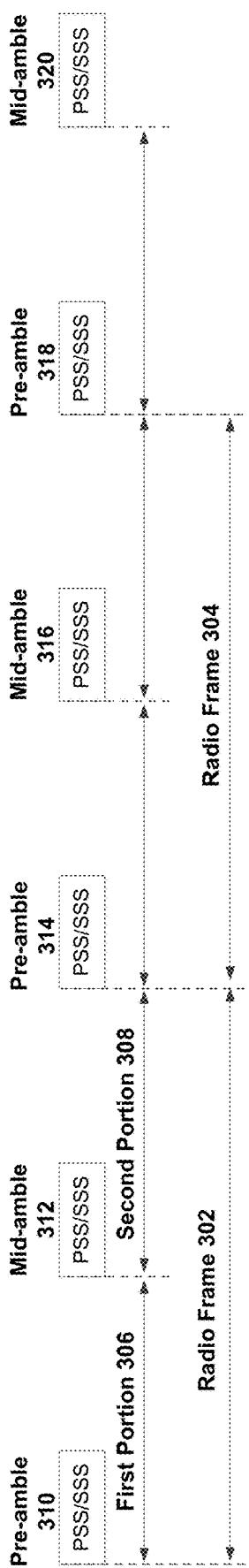
FIG. 3 is a conceptual diagram of an example baseline synchronization signal transmission scheme.

Referring to FIG. 3, a conceptual diagram of transmission scheme 300 for baseline synchronization signal transmissions according to a baseline synchronization signaling design is described. For example, transmission scheme 300 may include a plurality of radio frames 302, 304 with a pre-defined length of 10 ms divided into a first portion 306 of 5 ms in length, and a second portion 308 of 5 ms in length.

One or more pre-ambles 310, 314, 318 may be transmitted in the first portions (e.g., first portion 306 for pre-amble 310) of each radio frame 302, 304. In an aspect, the pre-amble 310, 314, 318 may include PSS and SSS. Further, one or more mid-ambles 312, 316, 320 may be transmitted in the second portion 308 of each radio frame 302, 304. In an aspect, the mid-amble 312, 316, 320 may include PSS and SSS. For example, SSS may be configured to signal radio frame timing. In an example, the SSS transmission in the first portion 306 of the radio frame 302 and the SSS transmission in the second portion 308 of the radio frame 302 may differ.

However, 5G/NR may support different sets of synchronization signal burst set periodicity values for adaptation and network indication. For example, candidate periodicity values may include, but are not limited to, 5, 10, 20, 40, 80 and 160 ms.

Figure 4:
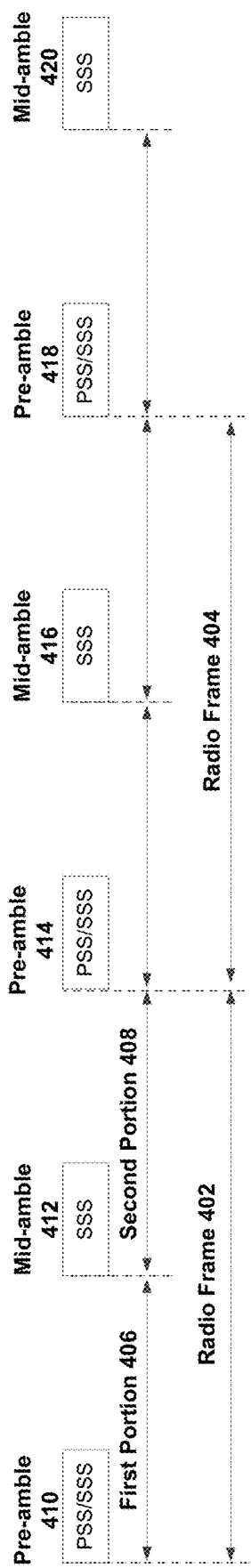
FIG. 4 is a conceptual diagram of an example asymmetric synchronization signal transmission scheme.

Referring to FIG. 4, a conceptual diagram of transmission scheme 400 for asymmetric synchronization signal transmissions for efficient operation in an NR wireless network is described. For example, transmission scheme 400 may include a plurality of radio frames 402, 404 with a predefined length of 10 ms divided into a first portion 406 of 5 ms in length, and a second portion 408 of 5 ms in length.

Transmission scheme 400 utilizes asymmetric synchronization signal transmissions, as most deployments may utilize a synchronization signal burst set periodicity that is an integer multiple of the radio frame duration (e.g., 10 ms), and thus deployments with 5 ms synchronization signal burst set periodicity may occur infrequently. To support deployments with 5 ms synchronization signal burst set periodicity, but to reduce complexity, a subset of signaling may be transmitted with 5 ms periodicity. In an aspect, for example, base station 105 may be configured to transmit both PSS and SSS in the pre-ambles 410, 414, 418, e.g., in the first portion of each radio frame, and SSS in the mid-ambles 412, 416, 420, e.g., in the second portion of each radio frame. In other words, the PSS is skipped or omitted from transmissions in the second portions (e.g., the second portion 408) of the radio frames (e.g., the radio frame 402). In an example, the same SSS may be transmitted in each of the second portions of the radio frames. In a further example, the PSS may be used to signal frame timing instead of SSS. As a result, transmission scheme 400 may provide a benefit of low SSS detection complexity, as there is no need to detect the mid-amble SSS in order to detect frame timing regardless of SS periodicity.

Figure 5:
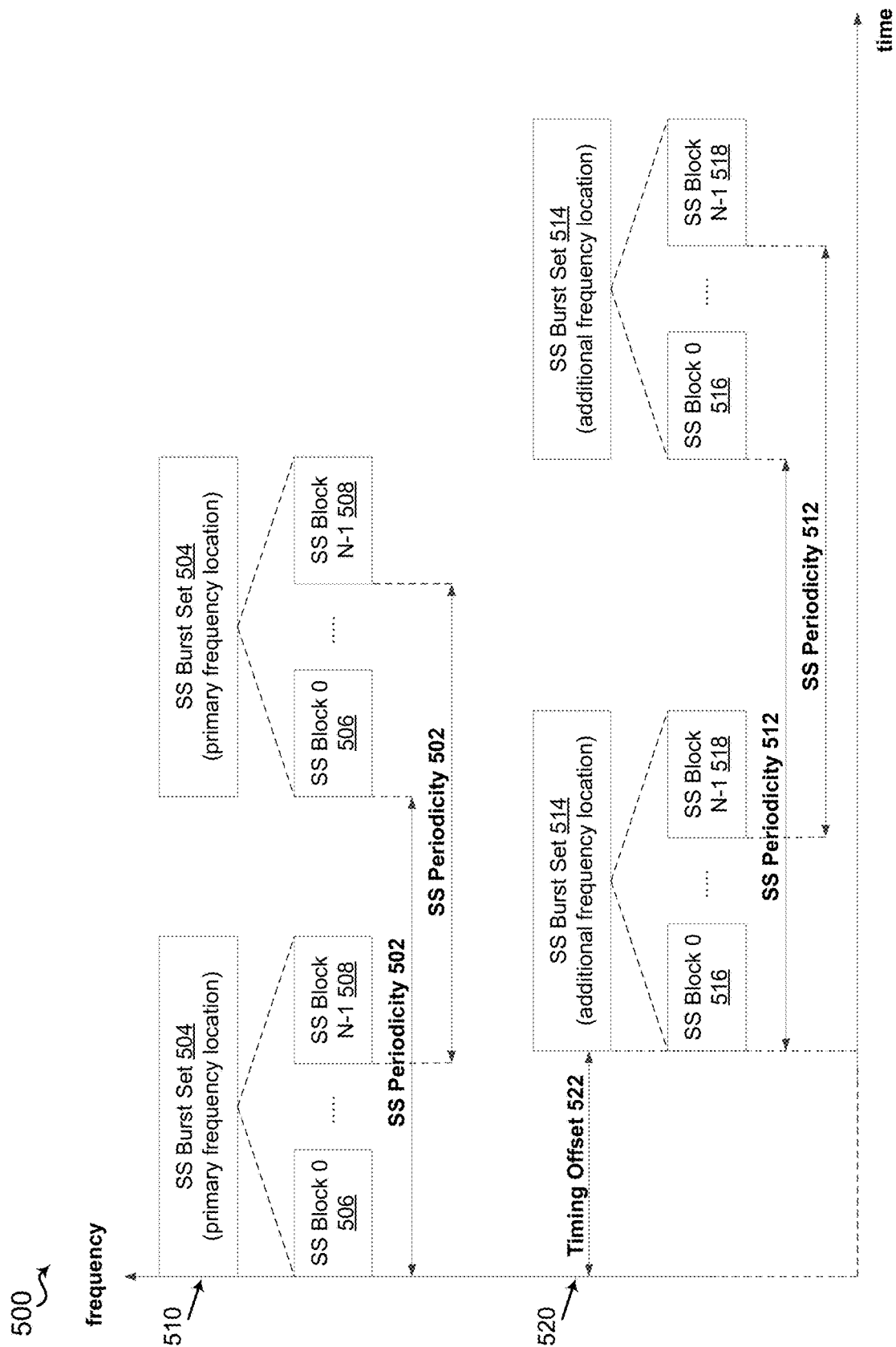
FIG. 5 is a conceptual diagram of an example multi-frequency synchronization signal burst set transmission scheme.

Referring to FIG. 5, a conceptual diagram of transmission scheme 500 for multi-frequency synchronization signal burst set transmissions with different periodicities and timing offsets is described. For example, transmission scheme 500 depicts the transmission of a plurality of synchronization signal burst sets 504, 514 over different frequencies 510, 520 over time and with timing offsets. The different frequencies 510, 520 may be within a same carrier frequency band, or in different carrier frequency bands (e.g., carrier aggregation).

In an aspect, at frequency 510, a base station, such as base station 105, may transmit a plurality of synchronization signal burst set 504 with a synchronization signal periodicity 502. For example, each synchronization signal burst set 504 may be comprised of a plurality of synchronization signal blocks, such as synchronization signal block 0 506 to synchronization signal block N-1 508. As described further herein, the repetitive transmission of the synchronization burst set 504 with the synchronization signal periodicity 502 corresponds to the repetitive transmission of synchronization signal burst 0 506 with a synchronization signal periodicity 502, and the repetitive transmission of synchronization signal block N-1 508 with the synchronization signal periodicity 502. In an example, as shown in FIG. 5, the periodicity between the first transmission of synchronization signal block 0 506 and the second transmission of synchronization signal block 0 506 is a value corresponding to synchronization signal periodicity 502. Similarly, the periodicity between the first transmission of synchronization signal block N-1 508 and the second transmission of synchronization signal block N-1 508 is a value corresponding to synchronization signal periodicity 502

In an aspect, at frequency 520, which may differ from frequency 510, a base station, such as base station 105, may transmit a plurality of synchronization signal burst set 514 with a synchronization signal periodicity 512 and a timing offset 522 for the first transmission of synchronization signal burst set 514. For example, each synchronization signal burst set 514 may be comprised of a plurality of synchronization signal blocks, such as synchronization signal block 0 516 to synchronization signal block N-1 518. In an example, as shown in FIG. 5, the repeated transmissions of synchronization signal burst set 514 may be similar to the repeated transmission of synchronization signal burst set 504. However, for the repeated transmission of synchronization signal burst 514, a timing offset 522 may be used to stagger the transmissions. Accordingly, the first transmission of synchronization signal block 0 516 occurs at a later time (corresponding to the value of timing offset 522) than the first transmission of synchronization signal block 0 506.

Furthermore, the value of synchronization signal periodicity 512 may differ from the value of synchronization signal periodicity 502. In an example, the value of synchronization signal periodicity 512 may be greater than the value of synchronization signal periodicity 502. Therefore, the repeated transmissions of synchronization signal block 0 516 have longer intervals between each transmission than the repeated transmissions of synchronization signal block 0 506.

Figure 6:
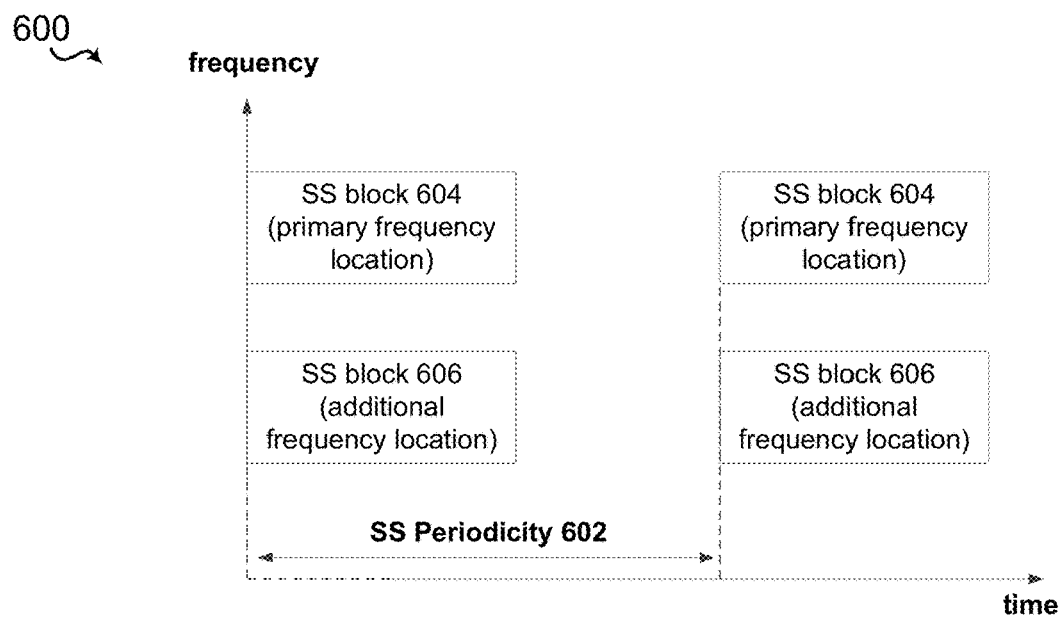
FIG. 6 is a conceptual diagram of an example multi-frequency synchronization signal transmission scheme.

Referring to FIG. 6, a conceptual diagram of transmission scheme 600 for multi-frequency synchronization signal transmissions with matching periodicities is described. For example, transmission scheme 600 depicts the transmission of a plurality of synchronization signal blocks 604, 606 over different frequencies over time. The different frequencies may be within a same carrier frequency band, or in different carrier frequency bands (e.g., carrier aggregation).

In an aspect, each of the transmissions over the different frequencies may start at a same time and have a same periodicity 602. For example, a base station, such as base station 105, may repeatedly transmit a first synchronization signal block 604 located in a primary frequency location with the same periodicity 602 as a second synchronization signal block 606 located in an additional frequency location. In an example, both the first and additional synchronization signal blocks may be transmitted every 6 ms, although other periodicities may be utilized.

Figure 7:
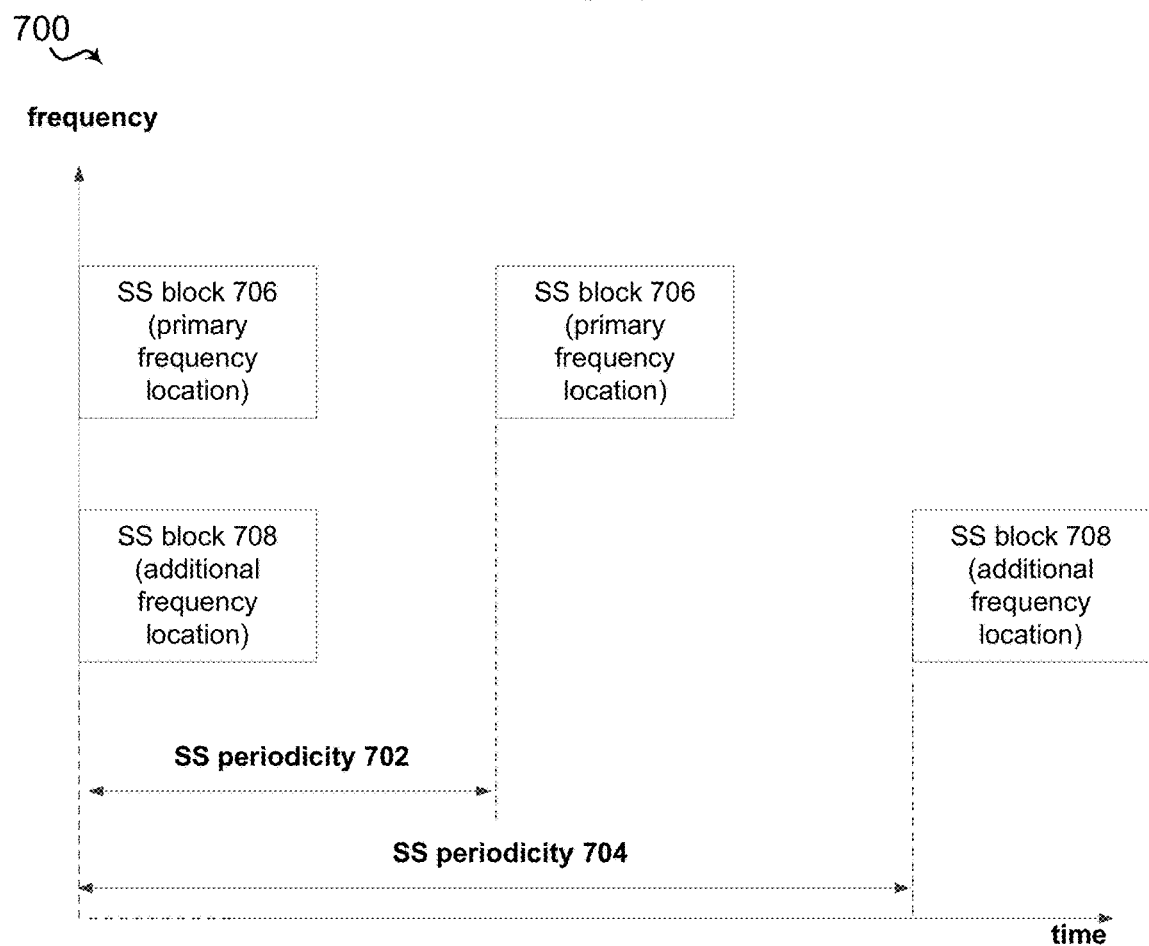
FIG. 7 is a conceptual diagram of another example multi-frequency synchronization signal transmission scheme.

Referring to FIG. 7, a conceptual diagram of transmission scheme 700 for multi-frequency synchronization signal transmissions with different periodicities is described. For example, transmission scheme 700 depicts the transmission of a plurality of synchronization signal blocks 706, 708 over different frequencies over time. The different frequencies may be within a same carrier frequency band, or in different carrier frequency bands (e.g., carrier aggregation).

Further, each of the transmissions over the different frequencies may start at a same time but may have different periodicities. For example, a base station, such as base station 105, may repeatedly transmit a first synchronization signal block 706 located in a primary frequency location with a first periodicity 702 while transmitting a second synchronization signal block 708 located in an additional frequency location with a second periodicity 704. In an example, the first synchronization signal block 706 may be transmitted every 5 ms while the second synchronization signal block 708 may be transmitted every 10 ms, although other periodicities may be utilized.

Figure 8:
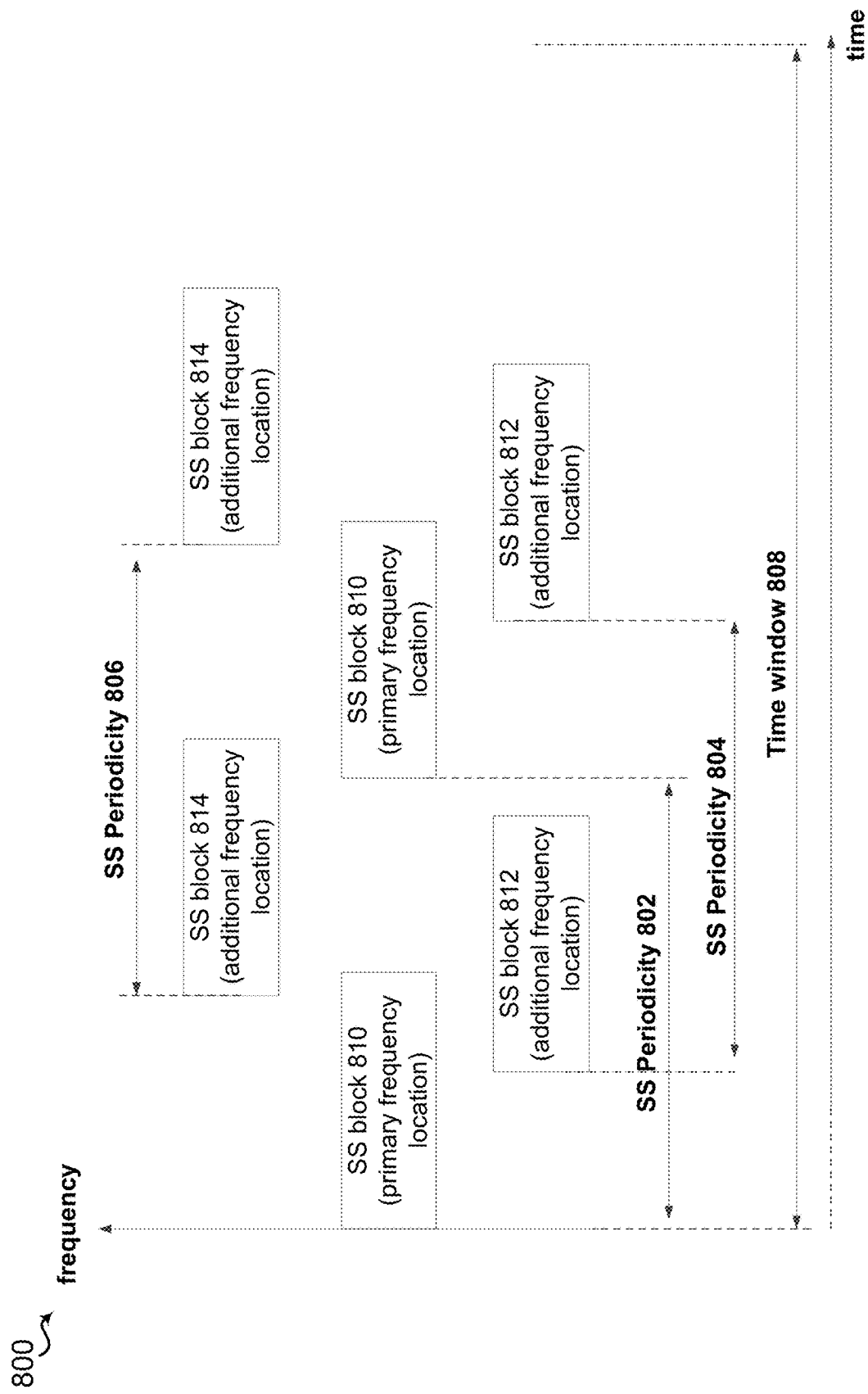
FIG. 8 is a conceptual diagram of an example staggered multi-frequency synchronization signal transmission scheme.

Referring to FIG. 8, a conceptual diagram of transmission scheme 800 for staggered multi-frequency synchronization signal transmissions is described. For example, transmission scheme 800 depicts the transmission of a plurality of synchronization signal blocks 810, 812, 814 over different frequencies over time within a time window 808. The different frequencies may be within a same carrier frequency band, or in different carrier frequency bands (e.g., carrier aggregation). Further, the transmissions over the different frequencies may the same or different (e.g., offset) starting times and/or may have the same or different periodicities.

In an aspect, a base station, such as base station 105, may repeatedly transmit a first synchronization signal block 810 located in a primary frequency location with a first periodicity 802 while staggering (e.g., offsetting) transmission of a second synchronization signal block 812 located in an additional frequency location with a second periodicity 804, and further staggering transmission of a third synchronization signal block 814 located in another additional frequency location with a third periodicity 806. In an example, the first, second, and third periodicities 802, 804, 806 may either be the same or different. Further, the amount of offset of the staggering of the transmissions of the second and third transmission blocks 812, 814 may be same of different. It should be understood that three different frequencies and periodicities and offsets are but one example, and that different numbers may be utilized.

In some instances, a subset of synchronization signal blocks in a burst set can be transmitted at the additional frequency locations.

In some instances, a subset of signals within each synchronization signal block at the additional frequency locations can be transmitted. For example, the subset of signals may include only transmitting the PSS and the SSS, although other subsets of signals may be utilized.

Figure 9:
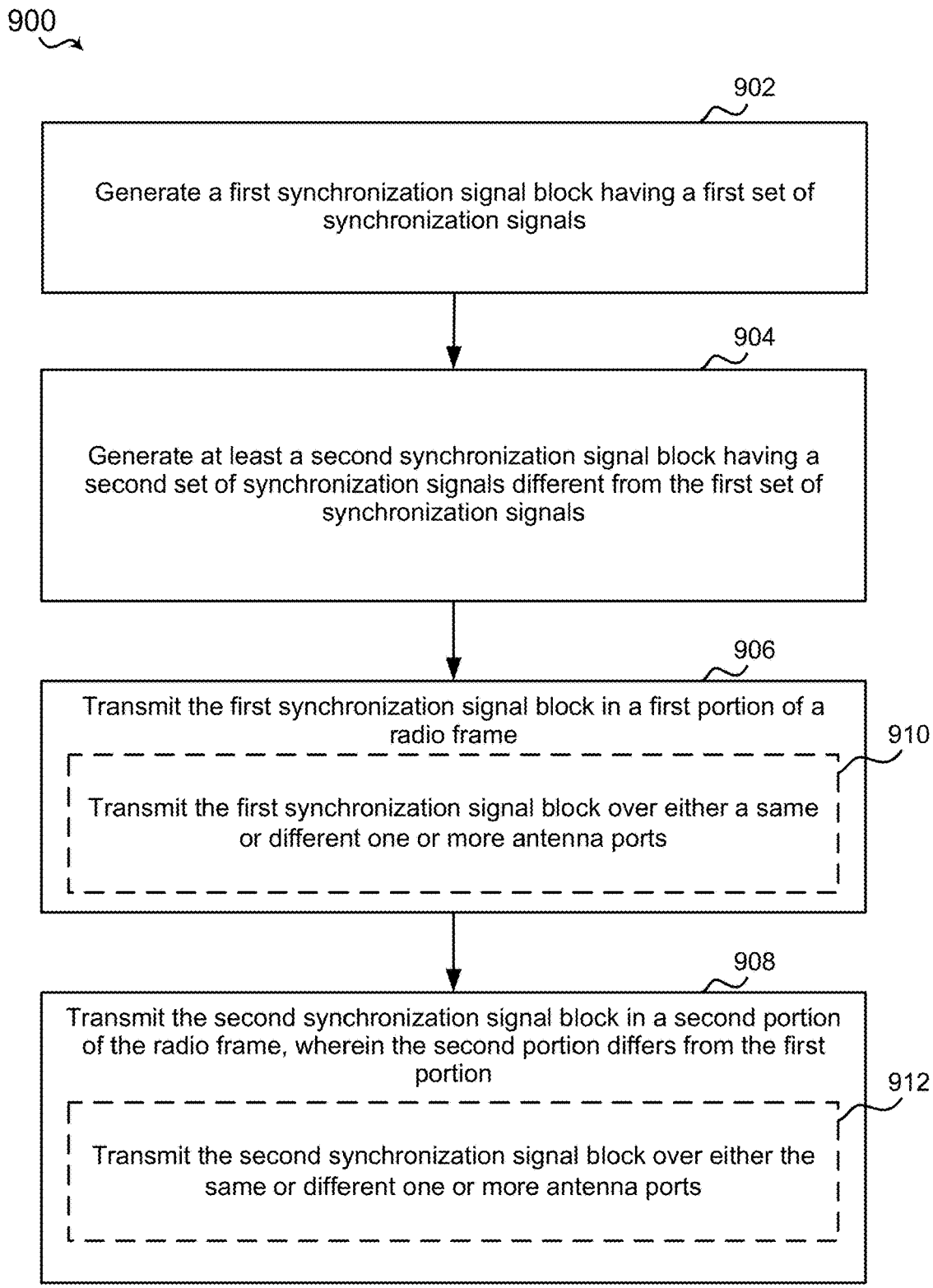
FIG. 9 is a flow diagram of an example of a method of wireless communication at a network entity.

Referring to FIG. 9, for example, a method 900 of wireless communication in operating a network entity such as base station 105 (e.g., gNodeB) according to the above-described aspects to enable configurable synchronization signal transmissions to reduce complexity of cell synchronization with a UE in a new radio environment includes one or more of the herein-defined actions. Specifically, method 900 is one example of operating base station 105 to execute synchronization component 170 to transmit different sets of synchronization signals asymmetrically.

At block 902, the method 900 may generate a first synchronization signal block having a first set of synchronization signals. For example, the base station 105 may execute synchronization component 170 and/or generation component 180 to generate a first synchronization signal block 184 having a first set of synchronization signals.

At block 904, the method 900 may generate at least a second synchronization signal block having a second set of synchronization signals different from the first set of synchronization signals. For example, the base station 105 may execute synchronization component 170 and/or generation component 180 to generate at least a second synchronization signal block 184 having a second set of synchronization signals different from the first set of synchronization signals. In some cases, each of the first set of synchronization signals and the second set of synchronization signals include at least one of a PSS, a SSS, a tertiary synchronization signal (TSS), and physical broadcast channel (PBCH).

At block 906, the method 900 may transmit the first synchronization signal block in a first portion of a radio frame. For example, the base station 105 and/or synchronization component 170 may execute transceiver 1202 (FIG. 12) to transmit the first synchronization signal block 184 in a first portion of a radio frame.

In an aspect, block 906 may optionally include sub-block 910 for transmitting the first synchronization signal block over either a same or different one or more antenna ports. For example, the base station 105 and/or synchronization component 170 may execute transceiver 1202 (FIG. 12) to transmit the first synchronization signal block 184 over either a same or different one or more antenna ports 1265.

At block 908, the method 900 may transmit the second synchronization signal block in a second portion of the radio frame, wherein the second portion differs from the first portion. For example, the base station 105 and/or synchronization component 170 may execute transceiver 1202 (FIG. 12) to transmit the second synchronization signal block 184 in a second portion of the radio frame, wherein the second portion differs from the first portion. In some cases, synchronization component 170 may configure the transceiver, such as transceiver 1202 to transmit the PSS, the SSS, the TSS, and the PBCH over a same antenna port or different antenna ports, such as the same or different ports of antenna(s) 1265. Transmitting these different block sets in different portions of the radio frame results in an asymmetrical transmission of synchronization signaling may provide the benefit of reduced SSS complexity.

In an aspect, block 908 may optionally include sub-block 912 for transmitting the second synchronization signal block over either the same or different one or more antenna ports. For example, the base station 105 and/or synchronization component 170 may execute transceiver 1202 (FIG. 12) to transmit the second synchronization signal block 184 over either the same or different one or more antenna ports 1265.

Figure 10:
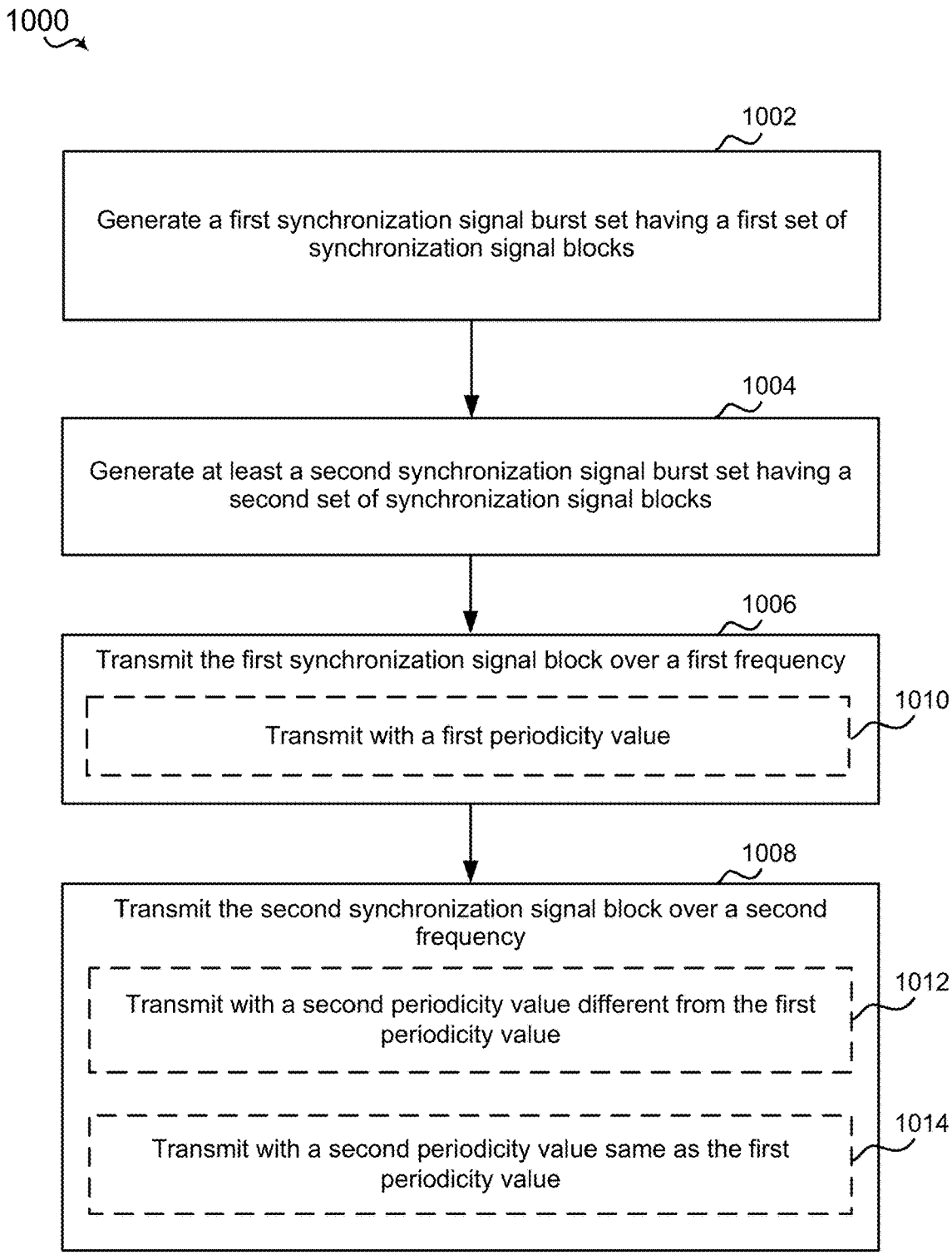
FIG. 10 is a flow diagram of an example of another method of wireless communication at a network entity.

Referring to FIG. 10, for example, a method 1000 of wireless communication in operating a network entity such as base station 105 (e.g., gNodeB) according to the above-described aspects to enable configurable synchronization signal transmissions to reduce complexity of cell synchronization with a UE in a new radio environment includes one or more of the herein-defined actions. Specifically, method 1000 is one example of operating base station 105 to execute synchronization component 170 to transmit the same or different sets of synchronization signals over different frequencies.

At block 1002, the method 1000 may generate a first synchronization signal burst set having a first set of synchronization signal blocks. For example, in an aspect, the base station 105 may execute synchronization component 170 and/or generation component 180 to generate a first synchronization signal burst set 182 having a first set of synchronization signal blocks 184.

At block 1004, the method 1000 may generate at least a second synchronization signal burst set having a second set of synchronization signal blocks. For example, in an aspect, the base station 105 may execute the synchronization component 170 and/or generation component 180 to generate at least a second synchronization signal burst set 182 having a second set of synchronization signal blocks 184. In some cases, the first frequency and the second frequency may be within a same carrier frequency band, while in other cases they may be in different carrier frequency bands. In an example, the first frequency differs from the second frequency. In another example, the first frequency is the same as the second frequency.

At block 1006, the method 1000 may transmit the first synchronization signal burst set over a first frequency. For example, in an aspect, the base station 105 and/or synchronization component 170 may execute transceiver 1202 (FIG. 12) to transmit the first synchronization signal burst set 182 over a first frequency to the UE 110.

In an aspect, block 1006 may optionally include sub-block 1010 for transmitting with a first periodicity value. For example, the base station 105 and/or synchronization component 170 may execute transceiver 1202 (FIG. 12) to transmit with a first periodicity value. The base station 105 and/or synchronization component 170 may execute transceiver 1202 (FIG. 12) to transmit the first synchronization signal burst set 182 over the first frequency periodically based on a first periodicity value.

At block 1008, the method 1000 may transmit the second synchronization signal burst set over a second frequency. For example, in an aspect, the base station 105 and/or synchronization component 170 may execute transceiver 1202 (FIG. 12) to transmit the second synchronization signal burst set 182 over a second frequency to the UE 110.

In an example, the base station 105 and/or synchronization component 170 may execute transceiver 1202 (FIG. 12) to transmit the second synchronization signal burst set 182 over the second frequency periodically based on a second periodicity value. For instance, block 1008 may optionally include sub-block 1012 for transmitting with a second periodicity value different from the first periodicity value. For example, the base station 105 and/or synchronization component 170 may execute transceiver 1202 (FIG. 12) to transmit with a second periodicity value different from the first periodicity value. In another aspect, block 1008 may optionally include sub-block 1014 for transmitting with a second periodicity same as the first periodicity value. For example, the base station 105 and/or synchronization component 170 may execute transceiver 1202 (FIG. 12) to transmit with a second periodicity value same as the first periodicity value.

In an example, method 1000 may include synchronization component 170 configuring the transceiver, such as transceiver 1202 (FIG. 10) to transmit the first synchronization signal block 184 by transmitting with a first periodicity and to transmit the second synchronization signal block 184 by transmitting with a second periodicity different from the first periodicity. In another aspect, synchronization component 170 may configure the transceiver, such as transceiver 1202 to transmit the first synchronization signal block 184 by transmitting with a first periodicity and to transmit the second synchronization signal block 184 by transmitting with a second periodicity same as the first periodicity.

In an example, method 1000 may include the base station 105 and/or synchronization component 170 executing transceiver 1202 (FIG. 12) to transmit synchronization information include at least the first periodicity value, the second periodicity value, a timing offset value for one or both of the first synchronization signal burst set 182 and the second synchronization signal burst set 182, and an indication of the first set of synchronization signal blocks 184 and the second set of synchronization signal blocks 184.

In an example, method 1000 may include the base station 105 and/or synchronization component 170 executing transceiver 1202 (FIG. 12) to transmit transmitting the first synchronization signal burst set 182 with a timing offset and/or transmit the second synchronization signal burst set 182 with a timing offset.

In an example, method 1000 may include that the first set of synchronization signals blocks 184 differ from the second set of synchronization signals blocks 184.

In an example, method 1000 may include the first set of synchronization signal blocks 184 is one of a first plurality of synchronization signal blocks 184 of the synchronization signal burst set 182, the second set of synchronization signal blocks 184 is one of a second plurality of synchronization signal blocks 184 of the synchronization signal burst set 182, and the second plurality of synchronization signal blocks 184 differs from the first plurality of synchronization signal blocks 184.

In an example, method 1000 may include the base station 105 and/or synchronization component 170 executing transceiver 1202 (FIG. 12) to transmit the first plurality of synchronization signal blocks 184 over the first frequency and/or transmit the second plurality of synchronization signal blocks 184 over the second frequency. In an implementation, the second plurality of synchronization signal blocks 184 is a subset of the first plurality of synchronization signal blocks 184.

In an example, method 1000 may include that each of the first set of synchronization signals blocks 184 and the second set of synchronization signals blocks 184 include a plurality of signals correspond to at least one of a primary synchronization signal (PSS), a secondary synchronization signal (SSS), a tertiary synchronization signal (TSS), and physical broadcast channel (PBCH).

In an example, method 1000 may include the base station 105 and/or synchronization component 170 executing transceiver 1202 (FIG. 12) to transmit at least one of the PSS, the SSS, the TSS, and the PBCH over a same antenna port or over different antenna ports.

Figure 11:
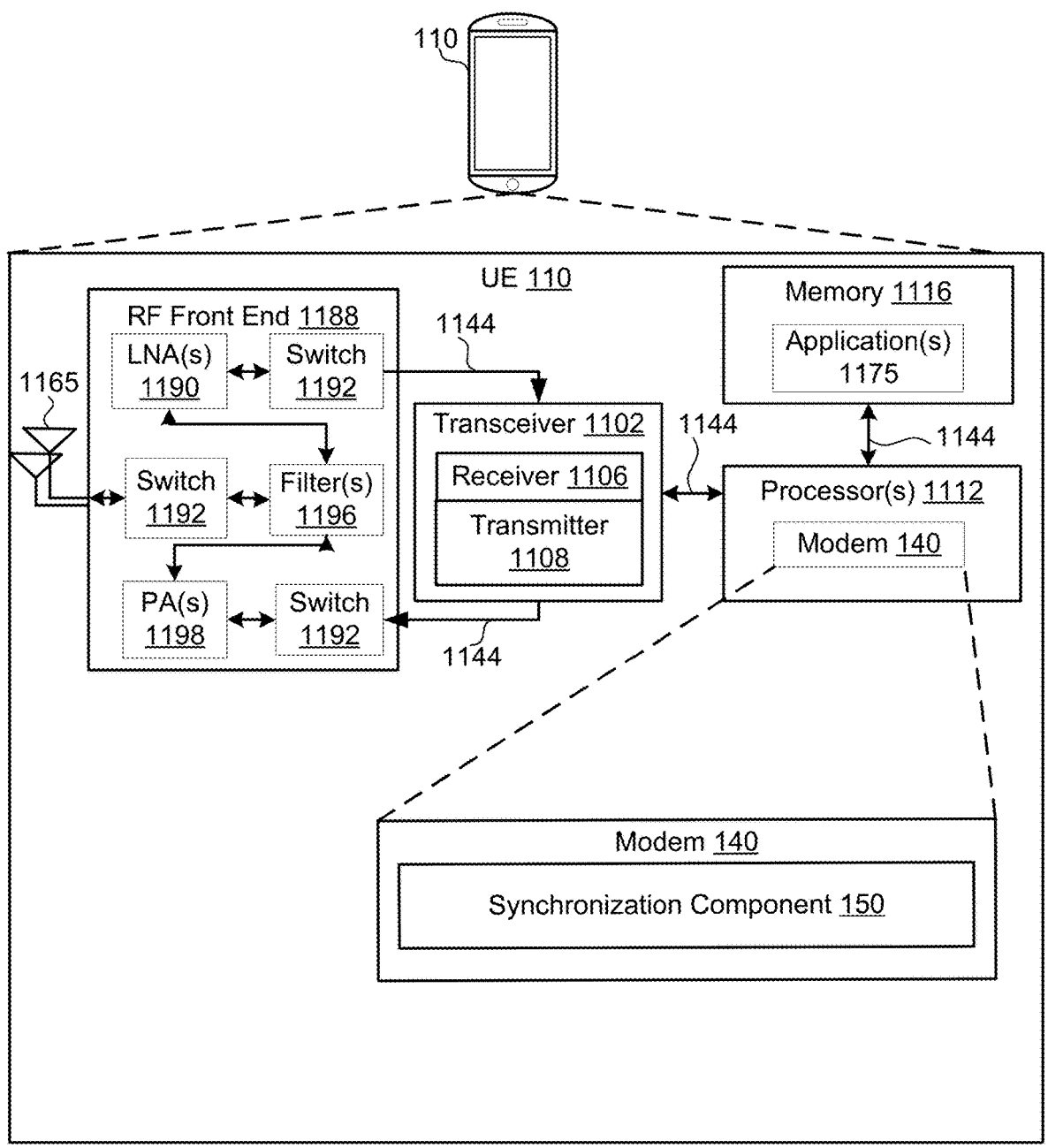
FIG. 11 is a schematic diagram of example components of the UE of FIG. 1.

Referring to FIG. 11, one example of an implementation of an UE 110 including components such as one or more processors 1112 and memory 1116 and transceiver 1102 for receiving and decoding synchronization signals, e.g., synchronization signal burst set 182, transmitted asymmetrically and/or over multiple different frequencies by base station 105, as described above. These components may be in communication via one or more buses 1144, which may operate in conjunction with modem 140 and synchronization component 150. Further, the one or more processors 1112, modem 1114, memory 1116, transceiver 1102, radio frequency (RF) front end 1188 and one or more antennas 1165, may be configured to support voice and/or data calls (simultaneously or non-simultaneously) in one or more radio access technologies. In some aspects, the modem 1114 may be the same as or similar to the modem 140 (FIG. 1).

In an aspect, the one or more processors 1112 can include a modem 1114 that uses one or more modem processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 140 may be performed by transceiver 1102.

Also, memory 1116 may be configured to store data used herein and/or local versions of applications 1175 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a RF receiver. In an aspect, receiver 1106 may receive signals transmitted by at least one base station 105. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may include, but is not limited to, an RF transmitter.

Moreover, in an aspect, the UE 110 may include RF front end 1188, which may operate in communication with one or more antennas 1165 and transceiver 1102 for receiving and transmitting radio transmissions, for example, wireless communications transmitted by at least one base station 105 or wireless transmissions transmitted by the UE 110. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, the RF front end 1188 may use one or more switches 1192 to select a particular PA 1198 and a corresponding specified gain value based on a desired gain value for a particular application.

Also, for example, one or more filters 1196 can be used by the RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that the UE 110 can communicate with, for example, one or more base stations 105 or one or more cells associated with one or more base stations 105. In an aspect, for example, modem 140 can configure transceiver 1102 to operate at a specified frequency and power level based on the UE configuration of the UE 110 and the communication protocol used by modem 140.

In an aspect, modem 140 can be a multiband-multimode modem, which can process digital data and communicate with transceiver 1102 such that the digital data is sent and received using transceiver 1102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 12:
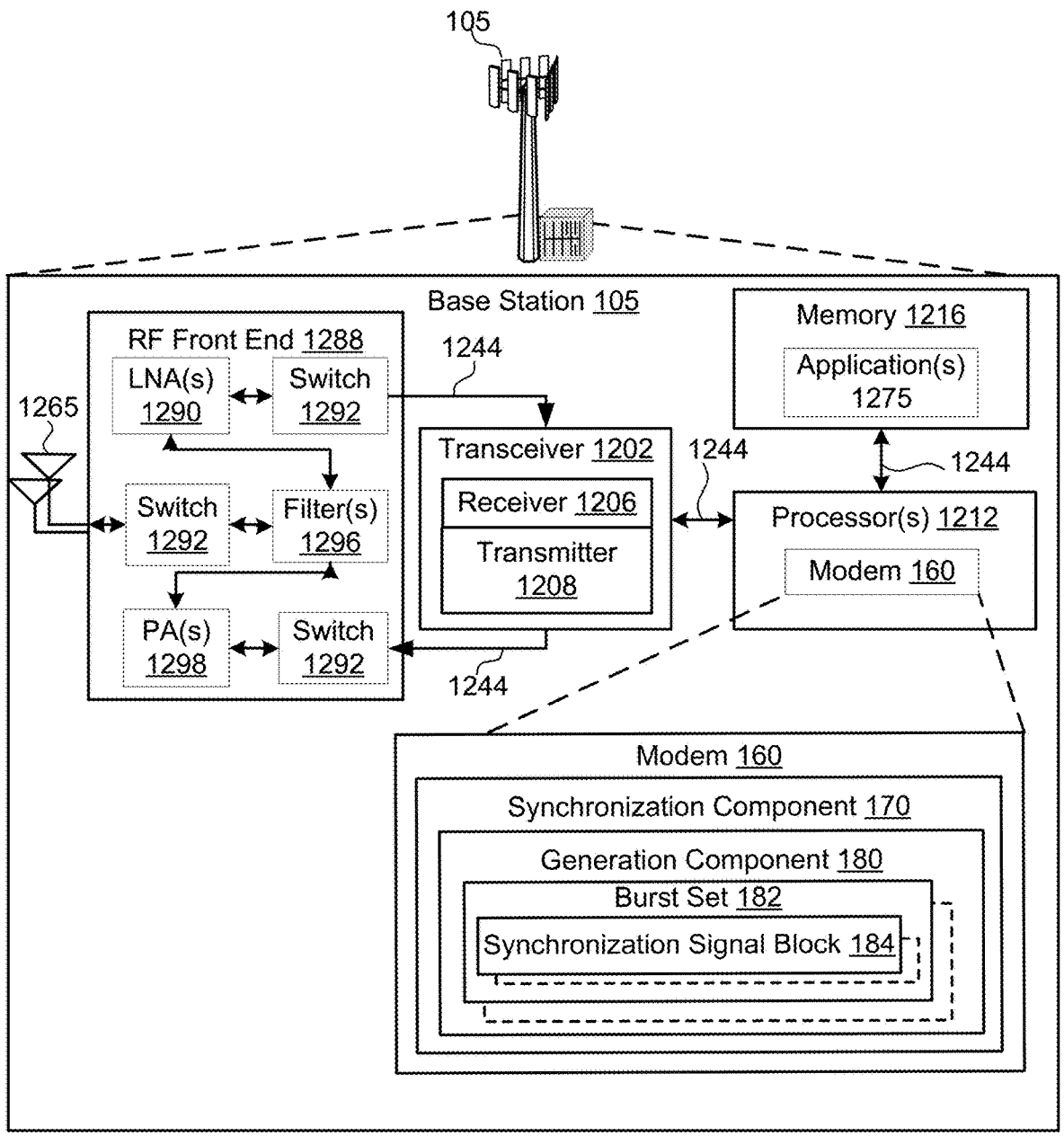
FIG. 12 is a schematic diagram of example components of the base station of FIG. 1.

Referring to FIG. 12, one example of an implementation of base station 105 may include a variety of components, some of which have already been described above, but including components such as one or more processors 1212, a memory 1216, and a transceiver 1202 in communication via one or more buses 1244, which may operate in conjunction with modem 160 and synchronization component 170 including generation component 180 to enable configurable synchronization signal transmissions to reduce complexity of cell synchronization with a UE in a new radio environment, as described above.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, at a network entity, comprising:
    generating a first synchronization signal burst set having a first set of synchronization signal blocks;
    generating at least a second synchronization signal burst set having a second set of synchronization signal blocks;
    transmitting, to a user equipment (UE), at least two periodicity values via at least one of system information or a Radio Resource Control (RRC) message;
    transmitting, to the UE, the first synchronization signal burst set over a first frequency at least twice based on a first periodicity value of the at least two periodicity values; and
    transmitting, to the UE, the second synchronization signal burst set over a second frequency at least twice based on a second periodicity value of the at least two periodicity values.

2. The method of claim 1, wherein the first frequency differs from the second frequency.

3. The method of claim 1, wherein generating the first synchronization signal burst set having the first set of synchronization signal blocks further comprises generating while the network entity is communicating with the UE that is in either an idle mode or connected mode, and
    wherein at least the second synchronization signal burst set having the second set of synchronization signal blocks further comprises generating while the network entity is communicating with the UE that is in either the idle mode or connected mode.

4. The method of claim 1, wherein the first periodicity value differs from the second periodicity value.

5. The method of claim 1, wherein the first periodicity value is the same as the second periodicity value.

6. The method of claim 1, wherein the first frequency and the second frequency are associated with a same frequency carrier or with different frequency carriers.

7. The method of claim 1, wherein transmitting the first synchronization signal burst set includes transmitting the first synchronization signal burst set with a first timing offset.

8. The method of claim 7, wherein transmitting the second synchronization signal burst set includes transmitting the second synchronization signal burst set with a second timing offset.

9. The method of claim 8, wherein the first timing offset either differs from or is the same as the second timing offset.

10. The method of claim 1, further comprising transmitting a timing offset via system information, a Radio Resource Control (RRC) message, or both.

11. The method of claim 1, wherein the first set of synchronization signal blocks differ from the second set of synchronization signal blocks.

12. The method of claim 1, wherein the first set of synchronization signal blocks is one of a first plurality of synchronization signal blocks of the synchronization signal burst set;
    wherein the second set of synchronization signal blocks is one of a second plurality of synchronization signal blocks of the synchronization signal burst set; and
    wherein the second plurality of synchronization signal blocks differs from the first plurality of synchronization signal blocks.

13. The method of claim 12, wherein transmitting the first synchronization signal burst set includes transmitting the first plurality of synchronization signal blocks over the first frequency; and
    wherein transmitting the second synchronization signal burst set includes transmitting the second plurality of synchronization signal blocks over the second frequency.

14. The method of claim 12, wherein the second plurality of synchronization signal blocks is a subset of the first plurality of synchronization signal blocks.

15. The method of claim 1, wherein each of the first set of synchronization signal blocks and the second set of synchronization signal blocks include a plurality of signals correspond to at least one of a primary synchronization signal (PSS), a secondary synchronization signal (SSS), a tertiary synchronization signal (TSS), and physical broadcast channel (PBCH); and transmitting at least one of the PSS, the SSS, the TSS, and the PBCH over a same antenna port or over different antenna ports.

16. An apparatus for wireless communication, comprising:
   a memory; and
   a processor in communication with the memory, wherein the processor is configured to:
      generate a first synchronization signal burst set having a first set of synchronization signal blocks;
      generate at least a second synchronization signal burst set having a second set of synchronization signal blocks;
      transmit, to a user equipment (UE), at least two periodicity values via system information or a Radio Resource Control (RRC) message;
      transmit, to the UE, the first synchronization signal burst set over a first frequency at least twice based on a first periodicity value of the at least two periodicity values; and
      transmit, to the UE, the second synchronization signal burst set over a second frequency at least twice based on a second periodicity value of the at least two periodicity values.

17. The apparatus of claim 16, wherein the first frequency either differs from or is the same as the second frequency.

18. The apparatus of claim 16, wherein the processor configured to generate the first synchronization signal burst set having the first set of synchronization signal blocks is further configured to generate while a network entity is communicating with the UE that is in either an idle mode or connected mode, and
   wherein the processor configured to generate at least the second synchronization signal burst set having the second set of synchronization signal blocks further configured while the network entity is communicating with the UE that is in either the idle mode or connected mode.

19. The apparatus of claim 16, wherein the first periodicity value either differs from or is the same as the second periodicity value.

20. The apparatus of claim 16, wherein the processor is further configured to transmit a timing offset via system information, a Radio Resource Control (RRC) message, or both.

21. The apparatus of claim 16, wherein the first frequency and the second frequency are associated with a same frequency carrier or with different frequency carriers.

22. The apparatus of claim 16, wherein the processor configured to transmit the first synchronization signal burst set is further configured to transmit the first synchronization signal burst set with a timing offset.

23. The apparatus of claim 16, wherein the processor configured to transmit the second synchronization signal burst set is further configured to transmit the second synchronization signal burst set with a timing offset.

24. The apparatus of claim 16, wherein the first set of synchronization signal blocks differ from the second set of synchronization signal blocks.

25. The apparatus of claim 16, wherein the first set of synchronization signal blocks is one of a first plurality of synchronization signal blocks of the synchronization signal burst set;
   wherein the second set of synchronization signal blocks is one of a second plurality of synchronization signal blocks of the synchronization signal burst set; and
   wherein the second plurality of synchronization signal blocks differs from the first plurality of synchronization signal blocks.

26. The apparatus of claim 25, wherein the processor configured to transmit the first synchronization signal burst set is further configured to transmit the first plurality of synchronization signal blocks over the first frequency; and
   wherein the processor configured to transmit the second synchronization signal burst set is further configured to transmit the second plurality of synchronization signal blocks over the second frequency.

27. The apparatus of claim 25, wherein the second plurality of synchronization signal blocks is a subset of the first plurality of synchronization signal blocks.

28. The apparatus of claim 16, wherein each of the first set of synchronization signal blocks and the second set of synchronization signal blocks include a plurality of signals correspond to at least one of a primary synchronization signal (PSS), a secondary synchronization signal (SSS), a tertiary synchronization signal (TSS), and physical broadcast channel (PBCH); and
   wherein the processor is configured to transmit at least one of the PSS, the SSS, the TSS, and the PBCH over a same antenna port or over different antenna ports.

29. An apparatus for wireless communication, comprising:
   means for generating a first synchronization signal burst set having a first set of synchronization signal blocks;
   means for generating at least a second synchronization signal burst set having a second set of synchronization signal blocks;
   means for transmitting, to a user equipment (UE), at least two periodicity values via system information or a Radio Resource Control (RRC) message;
   means for transmitting, to the UE, the first synchronization signal burst set over a first frequency at least twice based on a first periodicity value of the at least two periodicity values; and
   means for transmitting, to the UE, the second synchronization signal burst set over a second frequency at least twice based on a second periodicity value of the at least two periodicity values.

30. A non-transitory computer-readable medium storing computer code executable by a processor for wireless communications, at a network entity, comprising:
   code for generating a first synchronization signal burst set having a first set of synchronization signal blocks;
   code for generating at least a second synchronization signal burst set having a second set of synchronization signal blocks;
   code for transmitting, to a user equipment (UE), at least two periodicity values via system information or a Radio Resource Control (RRC) message;
   code for transmitting, to the UE, the first synchronization signal burst set over a first frequency at least twice based on a first periodicity value of the at least two periodicity values; and
   code for transmitting, to the UE, the second synchronization signal burst set over a second frequency at least twice based on a second periodicity value of the at least two periodicity values.

* * * * *